United States Patent
Langeslag et al.

(10) Patent No.: US 11,632,045 B2
(45) Date of Patent: Apr. 18, 2023

(54) COMPENSATING GAIN LOSS FOR A POWER CONVERTER IN DCM AND CCM

(71) Applicant: NXP USA, Inc., Austin, TX (US)

(72) Inventors: Wilhelmus Hinderikus Maria Langeslag, Wijchen (NL); Remco Twelkemeijer, Wijchen (NL)

(73) Assignee: NXP USA, Inc., Austin, TX (US)

( * ) Notice: Subject to any disclaimer, the term of this patent is extended or adjusted under 35 U.S.C. 154(b) by 83 days.

(21) Appl. No.: 17/198,884

(22) Filed: Mar. 11, 2021

(65) Prior Publication Data
US 2022/0294332 A1 Sep. 15, 2022

(51) Int. Cl.
| | |
|---|---|
| *H02M 3/156* | (2006.01) |
| *H02M 1/44* | (2007.01) |
| *H02M 3/155* | (2006.01) |
| *H02M 1/14* | (2006.01) |
| *H02M 1/42* | (2007.01) |

(52) U.S. Cl.
CPC .............. *H02M 3/156* (2013.01); *H02M 1/44* (2013.01); *H02M 3/155* (2013.01); *H02M 1/143* (2013.01); *H02M 1/4225* (2013.01)

(58) Field of Classification Search
CPC ...... H02M 1/08; H02M 1/0022; H02M 1/143; H02M 3/155
See application file for complete search history.

(56) References Cited

U.S. PATENT DOCUMENTS

| | | | |
|---|---|---|---|
| 7,652,604 B2 | 1/2010 | Parayandeh et al. | |
| 8,975,887 B2* | 3/2015 | Galbis | H02M 3/156 323/284 |
| 10,276,351 B1* | 4/2019 | Kim | H02M 3/1582 |
| 10,734,887 B1 | 8/2020 | Halberstadt | |
| 2022/0302819 A1* | 9/2022 | Langeslag | H02M 1/0022 |

FOREIGN PATENT DOCUMENTS

| | | |
|---|---|---|
| CN | 106787668 A | 5/2017 |
| JP | 6964731 B1 * | 11/2021 |

OTHER PUBLICATIONS

Chen, F. et al. "Digital Control for improved Efficiency and Reduced Harmonic Distortion over Wide Load Range in Boost PFC Rectifiers." Copyrighted 2009 IEEE Xplore; 7 pgs.
(Continued)

*Primary Examiner* — Kyle J Moody
*Assistant Examiner* — Jye-June Lee (57) ABSTRACT

Various embodiments relate to a current loop controller configured to control a boost converter, including: an amplifier configured to scale a measured current; a subtractor configured to subtract the scaled measured current from a desired current and to output an error signal; a controller including an integral part and a proportional part configured to produce a control signal based upon the difference signal and a gain value, wherein the gain value is based upon a measured value $t_{ps}$, wherein $t_{ps}$ is the on-time plus the secondary time of the boost converter; and a switch signal generator configured to produce a gate signal based upon the control signal, wherein the gate signal controls the boost converter.

24 Claims, 8 Drawing Sheets

(56) References Cited

OTHER PUBLICATIONS

De Gusseme, K. et al. "Digitally Controlled Boost Power-Factor-Correction Converters Operating in Both Continuous and Discontinuous Conduction Mode." Copyrighted 2005 IEEE Xplore; 10 pgs.
Van De Sype, D., et al. Duty-Ratio Feedforward for Digitally Controlled Boost PFC Converters. Copyrighted 2005 IEEE Xplore; 3 pgs.
Xie, Manjing, et al. "Novel Current-Loop Feed-Forward Compensation for Boost PFC Converter." Copyrighted 2004 IEEE Xplore; 6 pgs.
Le, Hoai Nam et al.; "Circuit-Parameter-Independent Nonlinearity Compensation for Boost Converter Operated in Discontinuous Current Mode"; IEEE Transactions on Industrial Electronics, IEEE Service Center, Piscataway, NJ, USA, vol. 64, No. 2, pp. 1157-1166 (Feb. 1, 2017).
Lim, Shu Fan et al.; "A Simple Digital DCM Control Scheme for Boost PFC Operating in Both CCM and DCM" Energy Conversion Congress and Exposition (ECCE), 2010 IEEE, IEEE, Piscataway, NJ, USA, pp. 1218-1225 (Sep. 12, 2010).

* cited by examiner

COMPENSATING GAIN LOSS FOR A POWER CONVERTER IN DCM AND CCM

TECHNICAL FIELD

Various exemplary embodiments disclosed herein relate generally to compensating gain loss for a power converter in DCM and CCM.

BACKGROUND

A power factor controller (PFC controller may be used to control a boost converter. For a PFC controller working in continuous conduction mode (CCM), an average mode control may be used for regulating the current. This method is noise insensitive because the average current is used instead of peak current to control the current, which has the effect of smoothing out any noise. This method works fine for CCM, but for discontinuous conduction mode (DCM) the gain of the converter drops significantly.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Further various embodiments relate to a current loop controller configured to control a boost converter, including: an amplifier configured to scale a measured current; a subtractor configured to subtract the scaled measured current from a desired current and to output an error signal; a controller including an integral part and a proportional part configured to produce a control signal based upon the difference signal and a gain value, wherein the gain value is based upon a measured value $t_{ps}$, wherein $t_{ps}$ is the on-time plus the secondary time of the boost converter; and a switch signal generator configured to produce a gate signal based upon the control signal, wherein the gate signal controls the boost converter.

Various embodiments are described, wherein the gain value is inversely proportional to $t_{ps}$.

Various embodiments are described, wherein the frequency of a zero of the current loop controller is changed based upon the measured value $t_{ps}$.

Various embodiments are described, wherein the gain value is further based upon a value of an input voltage $V_{in}$.

Various embodiments are described, wherein gain value is inversely proportional to $t_{ps}$ and $V_{in}$.

Various embodiments are described, wherein a frequency of a zero of the current loop controller is changed based upon the gain value and the value $V_{in}$.

Various embodiments are described, wherein the gain value is further based upon a directly measured value of the input voltage $V_{in}$.

Various embodiments are described, wherein the gain value is further based upon an indirectly derived value of the input voltage $V_{in}$.

Various embodiments are described, further including a gain circuit configured to produce the gain value.

Various embodiments are described, wherein the gain circuit is configured to receive $t_{ps}$.

Various embodiments are described, wherein the gain circuit is configured to receive $t_{ps}$ and a value of the input voltage $V_{in}$.

Various embodiments are described, wherein the gain circuit implements a gain function using one of an exact calculation of a gain equation, a look up table, a piecewise linear function, or a polynomial function.

Various embodiments are described, further including a measurement and detection circuit configured to measure $t_{ps}$, and to provide it to the gain circuit.

The current loop controller of claim 13, wherein the measurement and detection circuit is further configured to produce a mode signal, wherein the mode signal indicates when the boost converter is in continuous conduction mode (CCM) or discontinuous conduction mode (DCM).

Various embodiments are described, further including: a fixed gain element; and a switch, wherein the switch is configured to connect one of the fixed gain element and the gain circuit to the current loop controller based upon the mode signal.

Various embodiments are described, further including a clamp circuit that limits the output of the gain circuit to a predetermined value.

Various embodiments are described, wherein the gain value is based upon a predetermined constant, wherein the predetermined constant is based upon an output voltage of the boost converter, a frequency of a first current loop controller zero, a frequency of a second current loop controller zero, and a reference time, the first current loop controller zero is used when the boost converter is in a continuous conduction mode (CCM), the second current loop controller zero is used when the boost converter is in a discontinuous conduction mode (DCM), and the frequency of the second current loop controller zero is greater than the frequency of the first current loop controller zero.

Various embodiments are described, wherein the gain value is based upon a predetermined constant, wherein the predetermined constant is based upon a frequency of a first current loop controller zero, a frequency of a second current loop controller zero, and a reference time, the first current loop controller zero is used when the boost converter is in a continuous conduction mode (CCM), the second current loop controller zero is used when the boost converter is in a discontinuous conduction mode (DCM), and the frequency of the second current loop controller zero is greater than the frequency of the first current loop controller zero.

Further various embodiments relate to a including, an amplifier configured to scale a measured current; a subtractor configured to subtract the scaled measured current from a desired current and to output an error signal; a controller including an integral part and a proportional part configured to produce a control signal based upon the difference signal and a gain value, wherein the gain value is based upon a measured value $t_{ps}$, wherein $t_{ps}$ is the on-time plus the secondary time of the boost converter; a switch signal generator configured to produce a gate signal based upon the control signal, wherein the gate signal controls the boost converter, a gain circuit configured to produce the gain value; a measurement and detection circuit configured to measure $t_{ps}$ and to provide it to the gain circuit and to produce a mode signal, wherein the mode signal indicates when the boost converter is in continuous conduction mode (CCM) or discontinuous conduction mode (DCM); a fixed gain element; and a switch, wherein the switch is configured to connect one of the fixed gain element and the gain circuit to the PI controller based upon the mode signal.

Various embodiments are described, wherein the gain value is inversely proportional to $t_{ps}$.

Various embodiments are described, wherein the gain value is further based upon a value of the input voltage $V_{in}$.

Various embodiments are described, wherein the gain value is further based upon a directly measured value of the input voltage $V_{in}$.

Various embodiments are described, wherein the gain value is further based upon an indirectly derived value of the input voltage $V_{in}$.

Various embodiments are described, wherein gain value is inversely proportional to $t_{ps}$ and $V_{in}$.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments of a current loop controller are described herein that increase the loop gain such that the system stays stable and keeps enough bandwidth to achieve a low total harmonic distortion (THD) and a high power factor (PF) in all operating modes, including DCM.

Currently, simple PFC integrated circuits (ICs) that work in CCM and DCM make use of average current control, but do not have gain compensation for specific behavior in CCM and DCM, which can be very different. The main problem is that the gain of the current loop in CCM is high and the gain in DCM is low and not constant for all power levels and input voltages. When nothing is done to compensate for this effect, the loop bandwidth is less in DCM (versus CCM), which results in high THD and a low PF, because the PFC input current cannot follow the mains voltage. For a good THD and PF, the input current of the PFC converter should follow the mains voltage shape without a delay.

There are some published papers that discuss feedforward techniques to determine the required duty cycle and on time $t_{on}$ based on an equation that is not easy to implement without a DSP. Because the needed value is already calculated, the low bandwidth of the control loop is not a problem, because only small variations need to be made by the control loop which are good enough with a lower bandwidth.

Another method for compensating for DCM includes compensating the gain loss in DCM as compared to CCM. This method is used in the embodiments described herein and will be explained further below.

Figure 1:
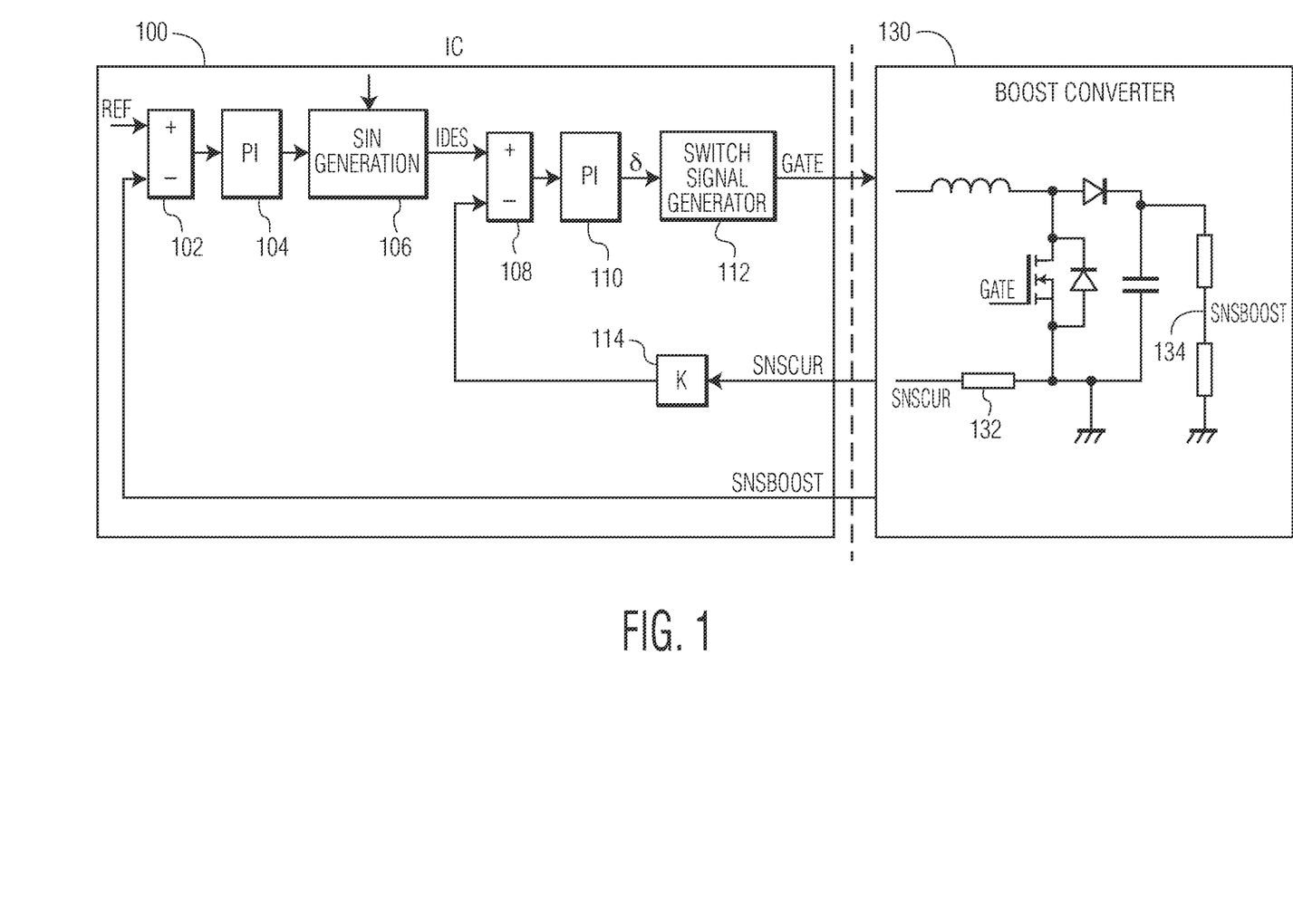
FIG. 1 illustrates a block diagram of a PFC using average current control to control a boost converter.

FIG. 1 illustrates a block diagram of a PFC using average current control to control a boost converter. The boost converter 130 is a typical boost converter that may allow for the measurement of current SNSCUR 132 and the voltage output of the boost converter SNSBOOST 134. The PFC converter includes a first subtractor 102, a first proportional integral (PI) controller 104, a sine wave generator 106, a second subtractor 108, a second PI controller 110, a switch signal generator 112, and a feedback gain filter 114. In FIG. 1, the PFC 100 includes two feedback loops. The outer loop which ensures that the output voltage SNSBOOST 134 of the boost converter 130 is always a fixed value (e.g., 400V). SNSBOOST 134 is input into the first subtractor where it is subtracted from a reference voltage Ref and the difference (error signal) is input into the first PI controller 104. This then controls the sine wave generator to generate a sine wave based upon the output of the first PI controller 104. The ideal requested current Ides from the sine wave generator 106 is then used in the inner loop to regulate the scaled input current of the PFC to the Ides. In general the Ides has a sine wave shape generated by the sine wave generator 106, which may be generated internally, but may also be derived from the mains voltage. The SNSUR is amplified by amplifier 114 and then subtracted from Ides by the second subtractor 108. The output of the second subtractor 108 is input into a second PI controller 110 which produces a control signal that is input into the switch signal generator 112. The switch signal generator generates the switch control signal that is used to open and close the switch in the boost converter 130.

Figure 2A:
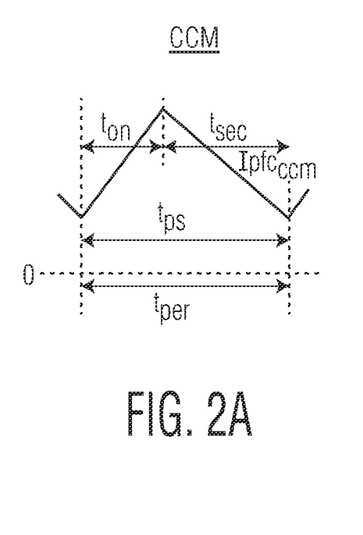
FIGS. 2A, 2B, 2C illustrate the current value and timing for the different control modes: CCM; BCM; and DCM.
Figure 2B:
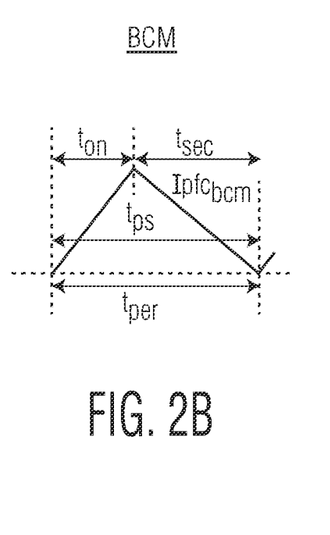
Figure 2C:
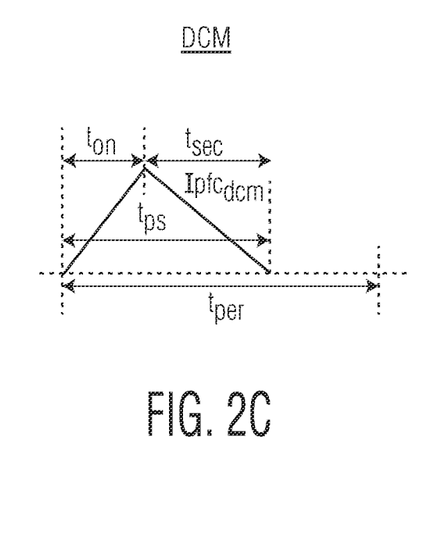

FIGS. 2A, 2B, 2C illustrate the current value and timing for the different control modes of the boost converter 130: continuous conduction mode (CCM); boundary conduction mode (BCM sometimes also called critical conduction mode or quasi resonant mode); and discontinuous conduction mode (DCM). Each input current signal of the boost converter has a period defined by $t_{per}$, which is the time of each period of the switching cycle. The switch is on for $t_{on}$ and the current the decreases for a secondary time $t_{sec}$. The value $t_{ps}$ is the time that the current is nonzero ($=t_{on}+t_{sec}$). In CCM, the current rises during $t_{on}$, then it drops during $t_{sec}$, but the current does not drop to zero, before the switching cycle ends. In BCM, the controller waits until the current is zero and the values of $t_{on}+t_{sec}$ ($=t_{ps}$) are equal to $t_{per}$. In DCM, the current drops to zero after the time $t_{sec}$, before the cycle ends.

As stated above, the gain of the current loop in DCM is smaller than the gain in CCM and is also dependent of the load, input voltage, etc. The transfer function of a boost converter in CCM is:

$$\frac{d}{d\delta} I_{pcf\_CCM} = \frac{V_{out}}{s \cdot L} \quad (1)$$

where $V_{out}$ is the output voltage of the boost converted and L is the inductance value of the inductor in the boost converter.

The transfer function in DCM is:

$$\frac{d}{d\delta} I_{pcf\_CCM} = \frac{V_{in}}{s} \cdot t_{ps} \cdot \frac{1}{\frac{1}{w_{lpf}}s+1} \quad (2)$$

where $$w_{lpf} = 2 \cdot \frac{(V_{out} - V_{in})}{t_{on} \cdot V_{in}} = \frac{2}{t_{sec}}. \quad (3)$$

Figure 3:
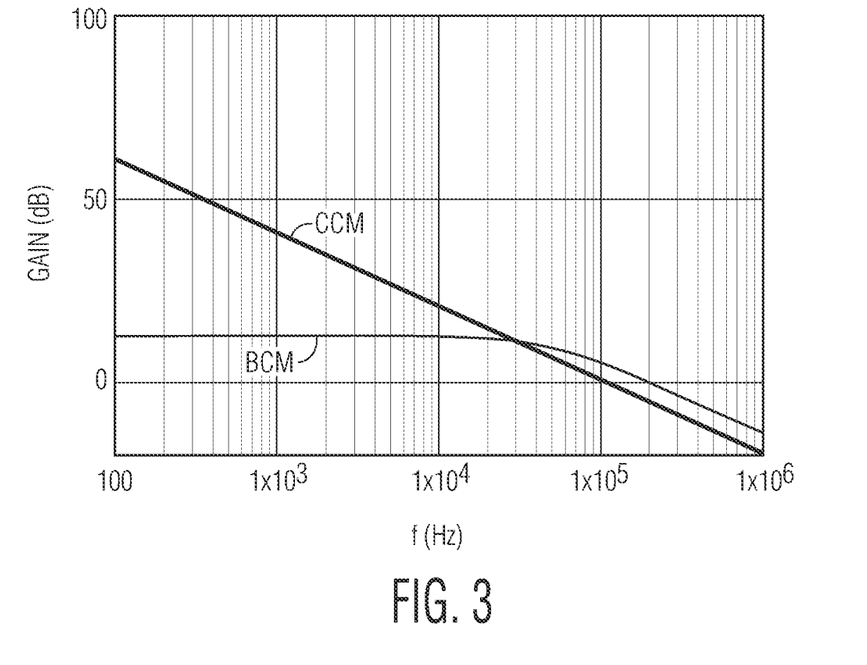
FIG. 3 illustrates a bode plot (only the gain part) of the gain of the boost converter in CCM mode and DCM mode based upon equations (1)-(3)

It can be seen that the transfer function in CCM is an integrator and the gain in DCM is a low pass filter. FIG. 3 illustrates a bode plot (only the gain part) of the gain of the boost converter in the CCM mode and DCM mode based upon equations (1)-(3). The BCM gain is plotted, because this illustrates the highest DCM gain at the border between DCM and CCM. FIG. 3 shows that the CCM transfer function is an integrator and the DCM transfer function is a low pass filter.

Figure 4:
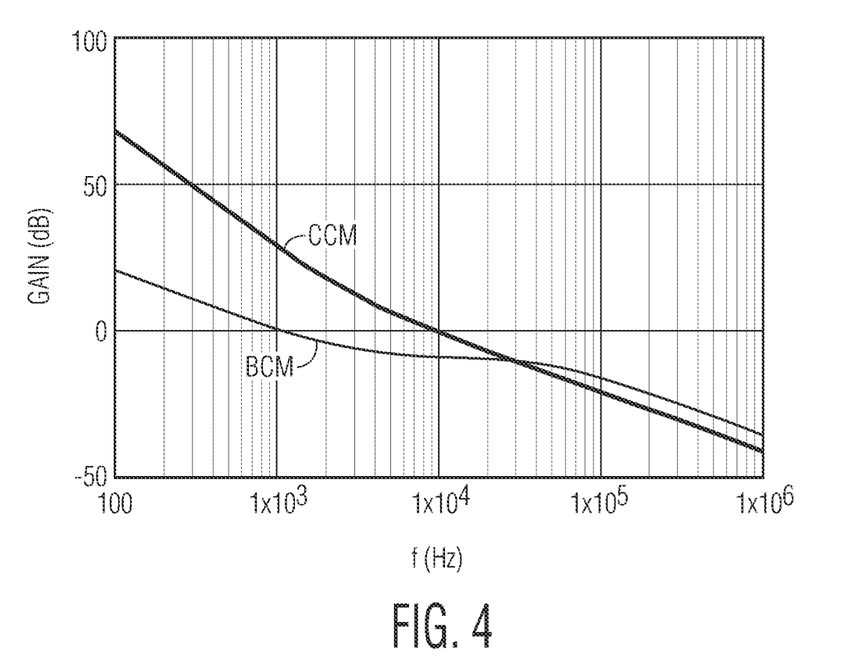
FIG. 4 illustrates a bode plot (only the gain part) of the loop gain for the boost converter with a PI controller with a zero at 2.8 kHz.
Figure 5:
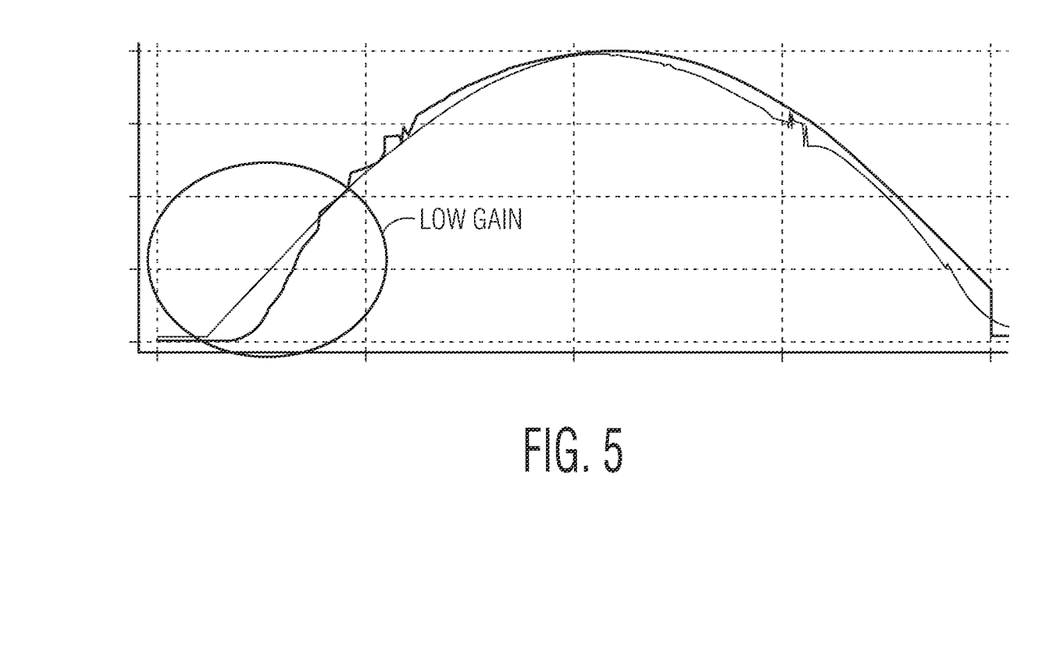
FIG. 5 illustrates a plot of the input current of the boost converter versus the ideal requested Ides current according to the current art.

The loop may be stabilized with a PI controller having a zero at 2.8 kHz, and the controller is designed such that the loop gain bandwidth is 10 kHz in CCM. FIG. 4 illustrates a bode plot (only the gain part) of the loop gain for the boost converted with a PI controller with a zero at 2.8 kHz. In FIG. 4 it may be seen that the loop gain in BCM is much lower than in CCM. FIG. 5 illustrates a plot of the input current of the boost converter versus the ideal requested Ides current according to the existing art. The Ides current is a sine wave, and as can be seen in the early part of the plot of the sine wave, the sensed current lags the Ides current in the area in the oval because the DCM bandwidth is too low to follow the sine wave of Ides. This results a high THD.

Embodiments of a PFC controller where the gain in DCM is increased such that the difference in loop bandwidth between CCM and DCM becomes less. When the pole in DCM is neglected, the transfer function of equation (2) may be rewritten to:

$$\frac{d}{d\delta} I_{pcf\_CCM} = \frac{V_{in}}{L} \cdot t_{ps} \quad (4)$$

Figure 6:
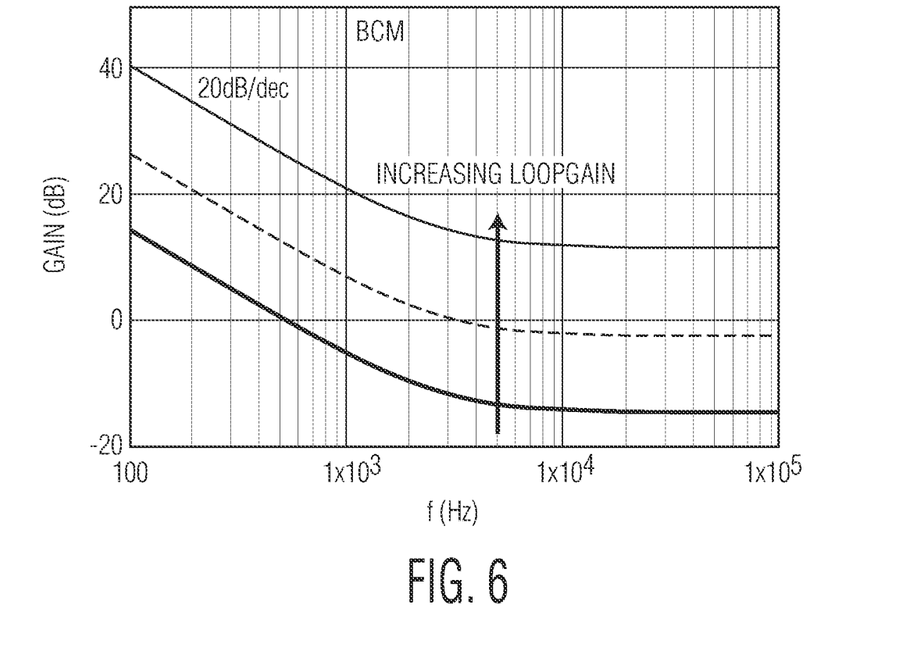
FIG. 6 illustrates the effect of boosting the gain of the loop when no additional poles for filtering are added.

From this equation, it may be seen that the gain in DCM is the highest at BCM, the boundary between CCM and DCM, because the tps is the largest. The lower gain in DCM and BCM may be compensated by using the inverted function of (4) and adding this as gain to the loop. The total loop gain is then boosted, but this means that the loop gain always stays high and that there is no damping of higher frequencies in the loop. This means that the loop becomes very sensitive to noise. FIG. 6 illustrates the effect of boosting the gain of the loop when no additional poles for filtering are added. As illustrated, the loop gain for lower frequencies increases, but so does the loop gain at higher frequencies.

Figure 7:
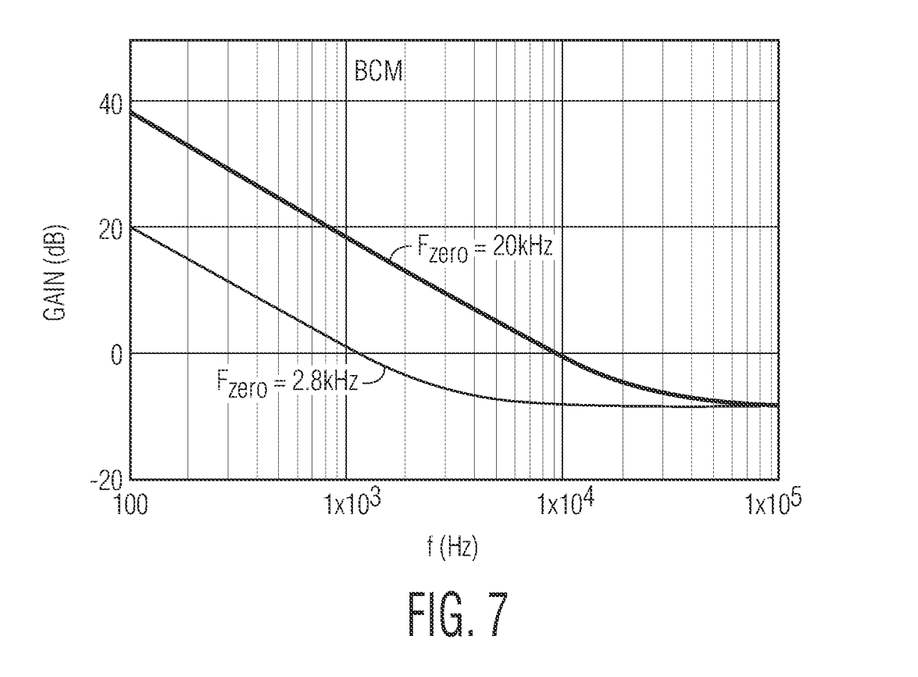
FIG. 7 illustrates the effect when the zero for the loop is placed at a higher frequency of 20 kHz in this example.

Another better way of changing the loop gain is by changing the position of the zero of the PI controller. This approach is better than just increasing the gain across all frequencies. FIG. 7 illustrates the effect when the zero for the loop is placed at a higher frequency of, for example, 20 kHz. It can be seen that the bandwidth is increased to 10 kHz and that frequencies above 10 kHz are damped, which makes the system less sensitive to noise. In a practical implementation, a filter may also be added at higher frequencies (e.g., 30-40 kHz) to make the system even more insensitive to noise. Adjusting the zero between CCM and DCM may be done without a negative impact of the current shape and/or switching behavior.

FIG. 7 illustrates that the loop bandwidth for DCM may be increased by changing the position of the zero of the PI controller. The controller may be designed in CCM with a loop bandwidth of 10 kHz (=f0 dB). The PI controller may be used to make the loop gain in DCM also 10 kHz by shifting the zero position. It may be calculated that the frequency of the zero should be multiplied by the following equation:

$$\frac{f_{zero}}{f_{zero\_0}} = \frac{\sqrt{V_{out}^2 \cdot f_{0dB}^2 - 4 \cdot \pi^2 \cdot V_{in}^2 \cdot f_{0dB}^4 \cdot t_{ps}^2 + V_{out}^2 \cdot f_{zero\_0}^2}}{2 \cdot \pi \cdot V_{in} \cdot f_{0dB} \cdot t_{ps} \cdot f_{zero\_0}} = f(V_{in} \cdot t_{ps}) \quad (5)$$

This function may be approximated by:

$$\frac{f_{zero}}{f_{zero\_0}} = \frac{K_1}{t_{ps} \cdot V_{in}} \quad (6)$$

where assuming $t_{ps}=t_{ps\_ref}$ (a reference time) and $V_{in}=V_{out}$ a value for $K_1$ is:

$$K_1 = \frac{V_{out} \sqrt{f_{0dB}^2 - 4 \cdot \pi^2 \cdot f_{0dB}^4 \cdot t_{ps\_ref}^2 + f_{zero\_0}^2}}{2 \cdot \pi \cdot f_{0dB} \cdot f_{zero\_0}} \quad (7)$$

It is noted that in most practical cases the THD improvement is good enough when there is no compensation for Vin. In this case equation (6) may be simplified:

$$\frac{f_{zero}}{f_{zero\_0}} = \frac{K_2}{t_{ps}} \quad (8)$$

where K2 is (for Vin=Vout):

$$K_2 = \frac{K_1}{V_{out}} = \frac{\sqrt{f_{0dB}^2 - 4 \cdot \pi^2 \cdot f_{0dB}^4 \cdot t_{ps\_ref}^2 + f_{zero\_0}^2}}{2 \cdot \pi \cdot f_{0dB} \cdot f_{zero\_0}} \quad (9)$$

The advantage of this simplification is that no actual Vin measurement is needed, and the calculations may be kept simple and the change in instability is less.

For practical reasons, the frequency of the zero should not be placed too high. As a result the gain from equations (6) and (8) may be limited to 10. Also, the zero should not be placed below the original zero so that the gain may never be lower than 1. When the zero is placed too high, the benefits of the filters which are in the design to keep noise out of the control loop will be less effective and the loop can become unstable.

Figure 8:
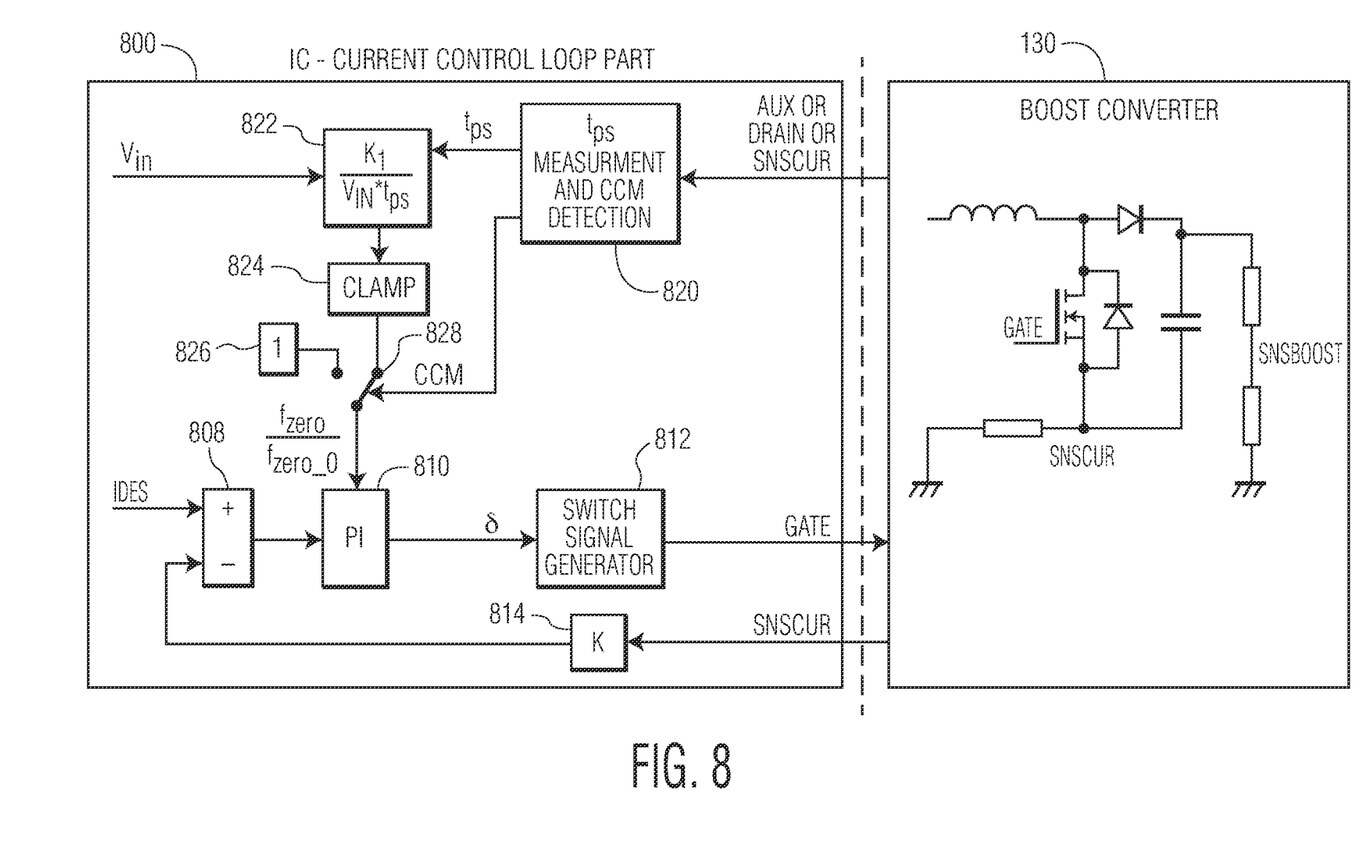
FIG. 8 illustrates an implementation of the current control loop based upon equation (6)

FIG. 8 illustrates an implementation of the current control loop based upon equation (6). The subtractor 808, PI controller 810, switch signal generator 812, and feedback gain 814 are the same as the equivalent elements in FIG. 1. The difference in FIG. 8 is the value input into PI controller 810. A measurement and detection circuit 820 measures the value of $t_{ps}$ and detects when the boost converter 130 is in the CCM or DCM mode. The value of $t_{ps}$ may be determined by the measurement and detection circuit 820 by monitoring an AUX winding on the inductor of the boost converter 130, the DRAIN voltage of the MOSFET of the boost converter, or the sensed current through the sense resistor (=SNSCUR). The time when the input current in the boost converter 130 goes to zero or reaches a minimum and then starts increasing (depending on where the boost converter is in CCM or DCM mode) is noted and then the value for $t_{ps}$ may be determined. Further, the boost converter mode is detected based upon whether the current in the boost converter 130 goes to zero for a period of time during the periodic cycle. If not, then the boost converter 130 is in CCM mode, and if so, then the boost converter 130 is not in CCM mode but rather the DCM mode. Hence, the measurement and detection circuit 820 produces a mode signal indicating whether the boost converter 130 is in CCM or DCM. In an alternative embodiment, CCM may be disabled in the controller, and the system always has to wait at least until the input current of the boost converter reaches zero. Then the system can only run in BCM and DCM.

A gain circuit 822 receives a value of $V_{in}$ and $t_{ps}$, from the measurement and control circuit 820. The value of $V_{in}$ may be directly measured or indirectly measured. An example of an indirect measurement of $V_{in}$ may be based on $V_{in}=V_{out}*(1-t_{on}/t_{ps})$ where $V_{out}$ may be taken as constant or may be measured. The gain circuit calculates the value $K_1/(V_{in} \cdot t_{ps})$. The value for $K_1$ may be calculated using equation (7) and is a fixed value that may be precomputed. As described above the value $K_1/(V_{in} \cdot t_{ps})$ may be clamped to a max value by the clamp circuit 824. For example, $K_1/(V_{in} \cdot t_{ps})$ may be clamped to 10. Next, a switch 828 determines whether the value of $K_1/(V_{in} \cdot t_{ps})$ or 1 is applied to the PI controller 828. The switch 828 is controlled by mode signal from the measurement and detection circuit 820. When the boost converter 130 is in CCM mode, the mode detection signal causes the switch to connect to constant gain element 826 which inputs a value of 1 into the PI controller 810. When the boost converter 130 is in DCM, the mode detection signal causes the switch 828 to connect to the output of the damp circuit, and thereby provide the value $K_1/(V_{in} \cdot t_{ps})$ to the PI controller 810, which causes the zero of the feedback loop to shift in frequency when the boost converter 130 is in DCM mode.

In this embodiment of the current control loop, $t_{ps}$ and $V_{in}$ are used for placing the position of the frequency of the zero of the PI controller 810. The value $K_1/(V_{in} \cdot t_{ps})$ may be implemented via an exact calculation of the equation, a look up table, a piecewise linear function, polynomial function, etc.

Figure 9:
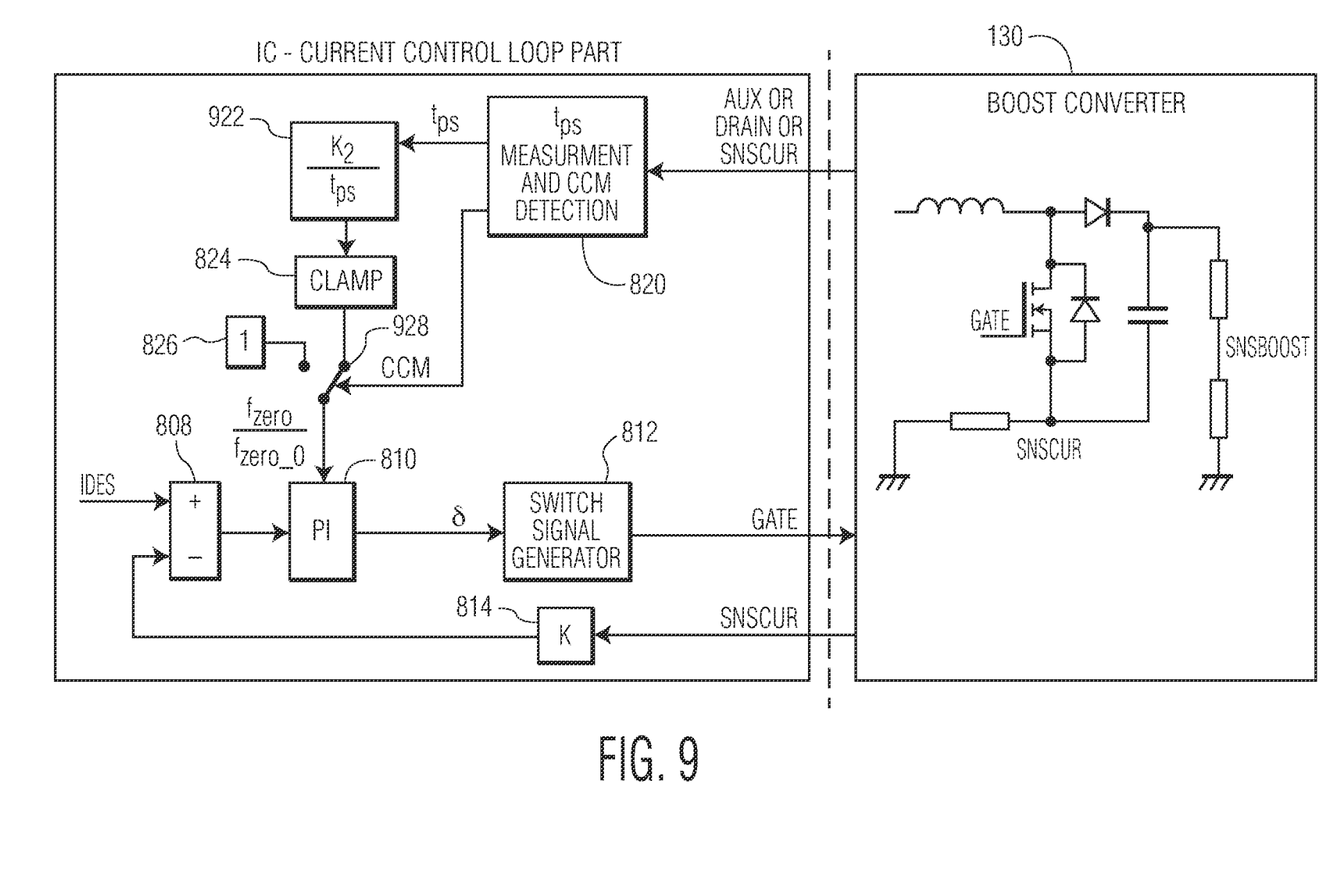
FIG. 9 illustrates an implementation of the current control loop based upon equation (8)

The loop control system 800 of FIG. 8 requires the value of Vo in order to move the zero of the feedback loop. As discussed above if $V_{in}$ is assumed to be the same as $V_{out}$, a value of $K_2/t_{ps}$ may be input into the PI controller instead of $K_1/(V_{in} \cdot t_{ps})$. FIG. 9 illustrates an implementation of the current control loop based upon equation (8). The current control loop of FIG. 9 is identical to that of FIG. 8, except for the gain circuit 922, which calculates a value of $K_2/t_{ps}$ instead of $K_1/(V_{in} \cdot t_{ps})$. This simplifies the gain circuit 922 as it only depends upon one input value and the precomputed constant $K_2$, which may be computed using equation (9). Again, the gain circuit 922 may be implemented via an exact calculation of the equation, a look up table, a piece wise linear function, a polynomial function, etc. This reduces the complexity of the current control loop. Further, the value of $V_{in}$ does not need to be determined, which further reduces the complexity of the current control loop.

Figure 10:
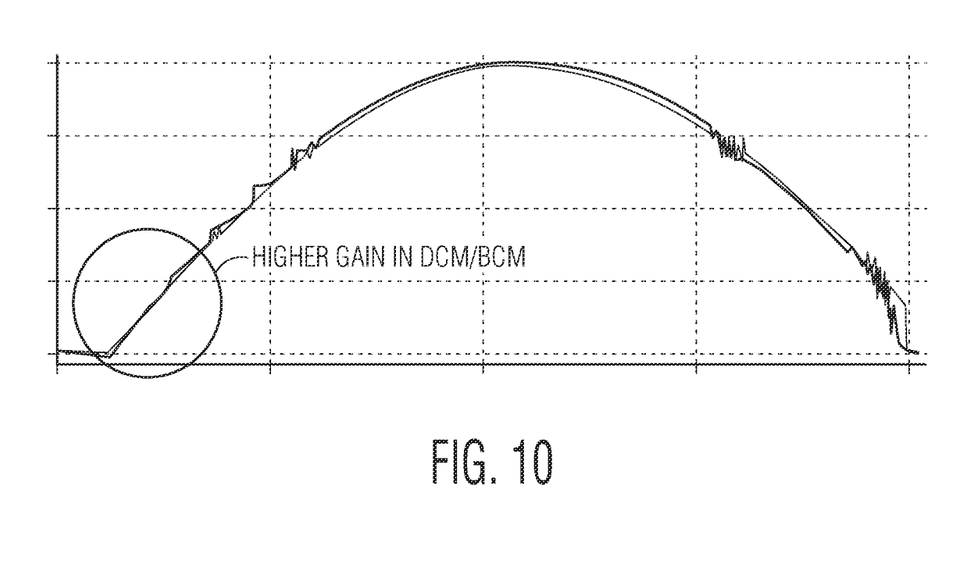
FIG. 10 illustrates a plot of the input current of the boost converter versus the ideal requested Ides current using the current control loop embodiment of FIG. 9.

FIG. 10 illustrates a plot of the input current of the boost converter versus the ideal requested Ides current using the current control loop embodiment of FIG. 9. As can be seen, the achieved current follows the ideal current Ides much more closely. This leads to a lower THD. The embodiment of FIG. 8 will have similar if not slightly better performance as well. Accordingly, the current control loop embodiments described herein improve the performance of a PFC controller and boost converter in DCM mode by moving the zero of the current feedback loop to a higher value. This is done by switching a scaling factor into the PI controller when the boost converted in DCM mode that shifts the zero up in frequency. This improves the bandwidth of the current feedback loop during DCM operation. As shown in the embodiments of FIG. 8 and FIG. 9, this may be accomplished with the small addition of some circuitry to adjust the input into the PI controller.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A current loop controller configured to control a boost converter, comprising:
    an amplifier configured to scale a measured current;
    a subtractor configured to subtract the scaled measured current from a desired current and to output an error signal;
    a controller including an integral part and a proportional part configured to produce a control signal based upon the error signal and a gain value, wherein the gain value is based upon a measured value $t_{ps}$, wherein $t_{ps}$ is an on-time plus a secondary time of the boost converter; and
    a switch signal generator configured to produce a gate signal based upon the control signal, wherein the gate signal controls the boost converter.

2. The current loop controller of claim 1, wherein the gain value is inversely proportional to $t_{ps}$.

3. The current loop controller of claim 1, wherein a frequency of a zero of the current loop controller is changed based upon the measured value $t_{ps}$.

4. The current loop controller of claim 1, wherein the gain value is further based upon a value of an input voltage $V_{in}$.

5. The current loop controller of claim 4, wherein the gain value is inversely proportional to $t_{ps}$ and $V_{in}$.

6. The current loop controller of claim 4, wherein a frequency of a zero of the current loop controller is changed based upon the gain value and the value of $V_{in}$.

7. The current loop controller of claim 4, wherein the gain value is further based upon a directly measured value of the input voltage $V_{in}$.

8. The current loop controller of claim 4, wherein the gain value is further based upon an indirectly derived value of the input voltage $V_{in}$.

9. The current loop controller of claim 1, further comprising a gain circuit configured to produce the gain value.

10. The current loop controller of claim 9, wherein the gain circuit is configured to receive $t_{ps}$.

11. The current loop controller of claim 9, wherein the gain circuit is configured to receive $t_{ps}$ and a value of an input voltage $V_{in}$.

12. The current loop controller of claim 9, wherein the gain circuit implements a gain function using one of an exact calculation of a gain equation, a look up table, a piecewise linear function, or a polynomial function.

13. The current loop controller of claim 9, further comprising a measurement and detection circuit configured to measure $t_{ps}$ and to provide it to the gain circuit.

14. The current loop controller of claim 13, wherein the measurement and detection circuit is further configured to produce a mode signal, wherein the mode signal indicates when the boost converter is in continuous conduction mode (CCM) or discontinuous conduction mode (DCM).

15. The current loop controller of claim 14, further comprising:
a fixed gain element; and
a switch, wherein the switch is configured to connect one of the fixed gain element and the gain circuit to the current loop controller based upon the mode signal.

16. The current loop controller of claim 9, further comprising a clamp circuit that limits an output of the gain circuit to a predetermined value.

17. The current loop controller of claim 1, wherein the gain value is based upon a predetermined constant, wherein
the predetermined constant is based upon an output voltage of the boost converter, a frequency of a first current loop controller zero, a frequency of a second current loop controller zero, and a reference time,
the first current loop controller zero is used when the boost converter is in a continuous conduction mode (CCM),
the second current loop controller zero is used when the boost converter is in a discontinuous conduction mode (DCM), and
the frequency of the second current loop controller zero is greater than the frequency of the first current loop controller zero.

18. The current loop controller of claim 1, wherein the gain value is based upon a predetermined constant, wherein
the predetermined constant is based upon a frequency of a first current loop controller zero, a frequency of a second current loop controller zero, and a reference time,
the first current loop controller zero is used when the boost converter is in a continuous conduction mode (CCM),
the second current loop controller zero is used when the boost converter is in a discontinuous conduction mode (DCM), and
the frequency of the second current loop controller zero is greater than the frequency of the first current loop controller zero.

19. A current loop controller configured to control a boost converter, comprising:
an amplifier configured to scale a measured current;
a subtractor configured to subtract the scaled measured current from a desired current and to output an error signal;
a PI controller including an integral part and a proportional part configured to produce a control signal based upon the error signal and a gain value, wherein the gain value is based upon a measured value $t_{ps}$, wherein $t_{ps}$ is an on-time plus a secondary time of the boost converter;
a switch signal generator configured to produce a gate signal based upon the control signal, wherein the gate signal controls the boost converter;
a gain circuit configured to produce the gain value;
a measurement and detection circuit configured to measure $t_{ps}$ and to provide it to the gain circuit and to produce a mode signal, wherein the mode signal indicates when the boost converter is in continuous conduction mode (CCM) or discontinuous conduction mode (DCM);
a fixed gain element; and
a switch, wherein the switch is configured to connect one of the fixed gain element and the gain circuit to the PI controller based upon the mode signal.

20. The current loop controller of claim 19, wherein the gain value is inversely proportional to $t_{ps}$.

21. The current loop controller of claim 19, wherein the gain value is further based upon a value of an input voltage $V_{in}$.

22. The current loop controller of claim 21, wherein the gain value is further based upon a directly measured value of the input voltage $V_{in}$.

23. The current loop controller of claim 21, wherein the gain value is further based upon an indirectly derived value of the input voltage $V_{in}$.

24. The current loop controller of claim 21, wherein the gain value is inversely proportional to $t_{ps}$ and $V_{in}$.

* * * * *